United States Patent [19]

Ellis

[11] 4,396,324

[45] Aug. 2, 1983

[54] TIE-DOWN RAIL APPARATUS FOR A PICK-UP TRUCK OR THE LIKE

[76] Inventor: Robert C. Ellis, Box 631-R.D. #5, Apollo, Pa. 15613

[21] Appl. No.: 251,302

[22] Filed: Apr. 6, 1981

[51] Int. Cl.³ .............................................. B60P 7/08
[52] U.S. Cl. .................................. 410/101; 410/104; 410/113; 410/115; 296/3
[58] Field of Search ................. 410/101, 106, 96, 97, 410/109, 110, 113, 115, 116, 37, 155, 89, 143–149, 152, 156, 104; 403/188, 191, 406, 144; 296/3, 36, 43; 248/251, 219.4, 205 R, 333, 334.1; 211/86; 105/380, 381, 382, 390

[56] References Cited

U.S. PATENT DOCUMENTS

| | | | |
|---|---|---|---|
| 2,715,468 | 8/1955 | Waltz | 248/251 |
| 3,149,811 | 9/1964 | Fremstad et al. | 248/251 |
| 3,365,230 | 1/1968 | Langdon | 296/3 |
| 3,524,627 | 8/1970 | Boyanton et al. | 248/205 |
| 3,643,973 | 2/1972 | Bott | 410/101 |
| 3,677,562 | 7/1972 | Bronstein | 410/97 |
| 3,729,159 | 4/1973 | Foster | 248/205 R |
| 3,836,174 | 9/1974 | Holman, Jr. | 410/149 |

*Primary Examiner*—Bruce H. Stoner, Jr.
*Assistant Examiner*—Donald Hajec
*Attorney, Agent, or Firm*—Clifford A. Poff; Thomas H. Murray

[57] ABSTRACT

A tie-down rail apparatus extends below top rim walls on side walls for a load-carrying bed of a pick-up truck. Rails extend between walls forming stake pockets where end portions of the rails each engages with a coupling socket extending from a holder which is supported by walls of the stake pocket. The holders have an L-shaped, U-shaped or S-shaped configuration to wrap around the walls of the stake pocket and support the coupling sockets. The rail is supported for telescoping movement from a connector in one modification and in another modification, the rail takes the form of a rectangular tube with a longitudinal slot to support tie fixtures at various locations along the slot.

10 Claims, 7 Drawing Figures

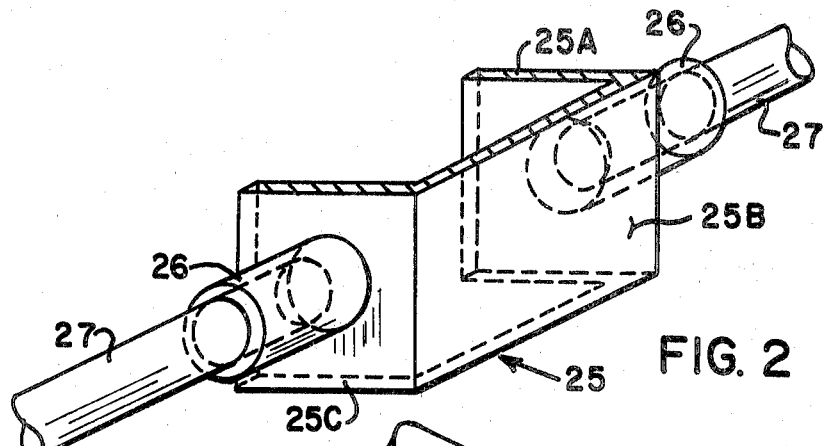
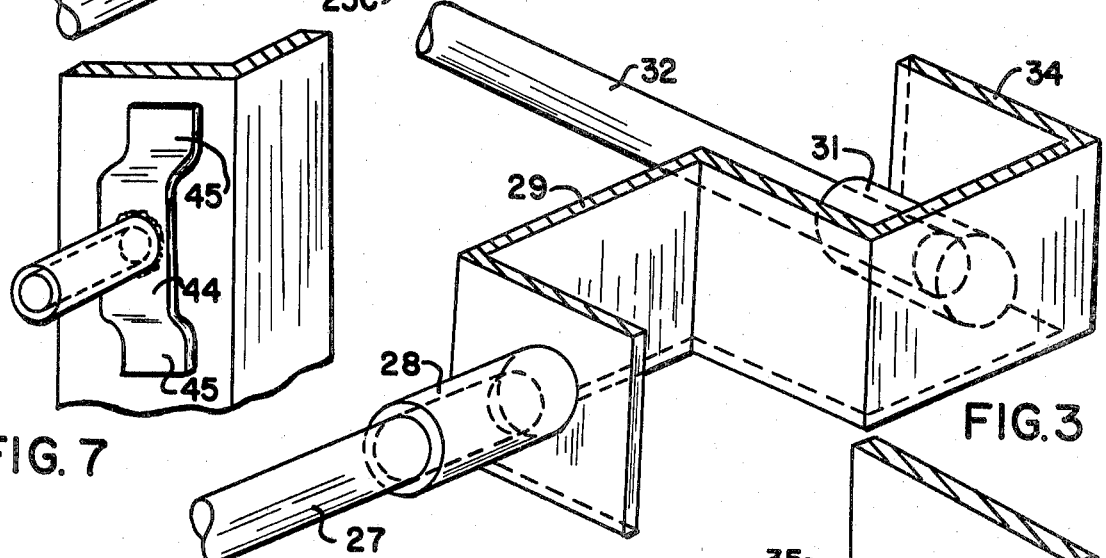
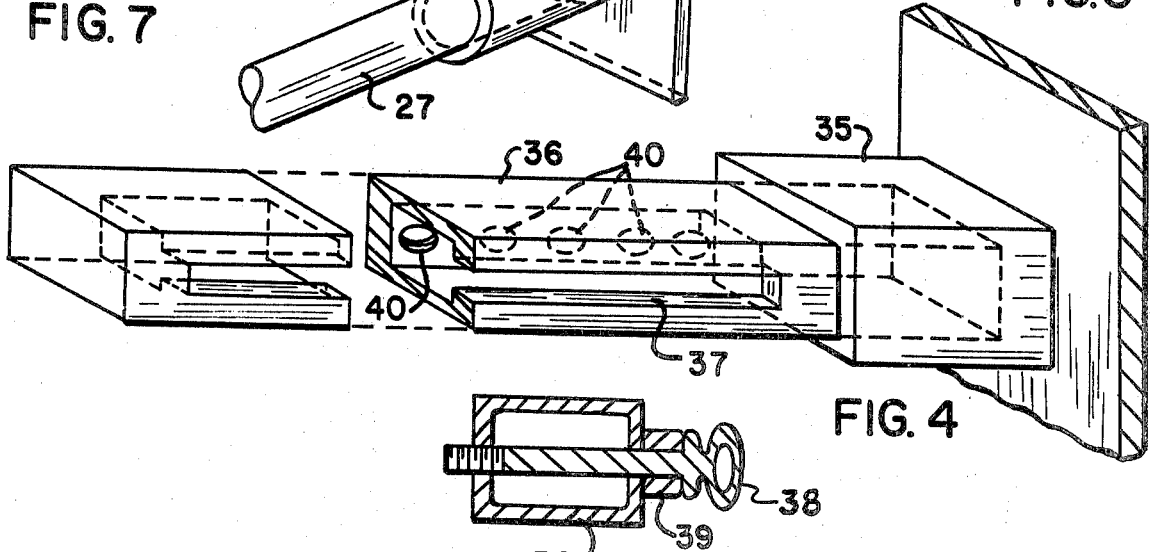
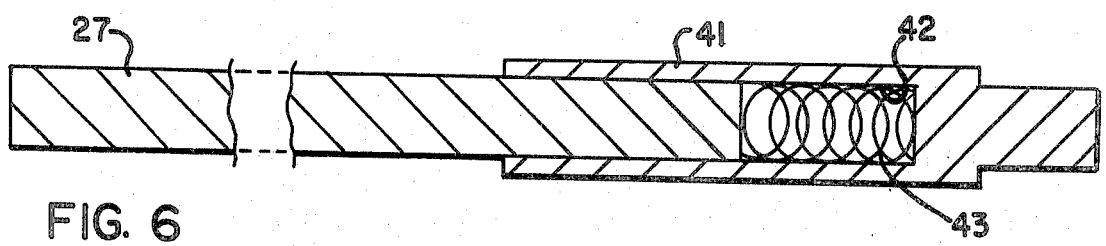

TIE-DOWN RAIL APPARATUS FOR A PICK-UP TRUCK OR THE LIKE

BACKGROUND OF THE INVENTION

This invention relates to a tie-down rail within the load-carrying bed of a pick-up truck or the like, and more particularly, the present invention relates to such a tie-down rail supported to extend within the confines of upstanding, longitudinal side walls for the load-carrying bed and, when desired, along the front side of the truck bed which is opposite the usual tailgate for attaching rope or other anchor mechanism extending from a load within the truck bed.

A pick-up truck and similar load-carrying vehicles usually incorporate stake pockets at spaced locations along opposite side walls of the truck bed. The stake pockets open out of the top edge of the side walls such that vertically-arranged stakes can be supported in the stake pockets. Sometimes the stake members are short or separate bolt-on brackets are used to support rails for extending along above the top edge of the bed side walls. The stakes can be used to anchor rope or other tie-down devices connected to cargo in the load-carrying area of the pick-up truck. In this way, the cargo can be secured to prevent possible unsafe operation of the vehicle due to shifting of the load as well as preventing possible damage to the load because of an impact or pounding with a contacted surface.

In U.S. Pat. No. 3,677,562, there is disclosed a cross beam to anchor cargo in a bed area of a pick-up truck by arranging the cross beam to span the distance between the side walls and supporting the beam by stake members in stake pockets. Sometimes such stack pockets are used to support a demountable rail or stake body structure such as disclosed in U.S. Pat. No. 3,365,230. Vertical stakes support nestable slats and the space between the slats could be utilized for securing a rope or other anchor device to a slat for preventing an unwanted shifting of cargo in the cargo area of the vehicle. The attachment sites for a rope on structures supported in the stake pockets are above the top edge of the side wall for the cargo area. The appearance of the stake members may be considered unsightly and they can be missing or even damaged at times when they are needed for tieing down cargo. Depending upon the circumstances, it is sometimes far more efficient to use attachment sites for ropes that are closer to the load-support area in the bed of the truck, and more particularly, below the top rim or edge of the side walls of the truck.

The stake pockets of a truck are sometimes covered by covers, usually called "caps" or "campers", that are transported along with the vehicle as an integral part thereof. Such a cover overlaps the top rim of the truck bed and thereby prevents access to the stake pockets for their use as receivers for stake members. This precludes the use of known tie-down apparatus as discussed above.

SUMMARY OF THE INVENTION

It is an object of the present invention to provide a tie-down rail apparatus for a pick-up truck or the like in which the apparatus embodies a construction and arrangement of parts to utilize wall members forming stake pockets along the wall area inside the longitudinal side walls of the truck bed.

More particularly, according to the present invention, there is provided a tie-down rail apparatus for a pick-up truck or other vehicle having a load-carrying bed and at least upstanding side walls including top rim walls extending along opposed, longitudinal sides of the bed, the upstanding side walls carrying spaced-apart stake walls forming vertical stake pockets opening out of the top rim walls, the tie-down rail apparatus extending below the top rim walls and essentially comprising at least two holders having a configuration to fit against the stake walls for attached support thereby, at least one coupling socket extending from each holder, and rail means having a sufficient length to extend between the holders for support by the coupling sockets thereof.

In one form, the holders embody a U-shaped configuration comprised of walls dimensioned to wrap around three sides of one of the stake walls. Opposed walls of such a holder each carries a coupling socket such that a rail can be supported to extend from one vertical stake wall to the next. In another form, the holder has an S-shaped configuration such that the walls thereof form two pockets opening from opposite sides. One pocket is dimensioned to wrap around the three sides of a wall for a stake pocket and the other such pocket contains a coupling socket extending from a back crosswall of the holder for engagement with a tie-down rail extending across the front wall of the truck bed.

The rail means may include a rail member and a connector having a pocket at one end for telescopic support of an end portion of the rail member. Resilient means is arranged between the rail member and the connector within the pocket of the connector. The rail means may comprise a tube having rectangular side walls, one of which defines a longitudinal slot to receive a tie fixture. The fixture is attached by a fastener extending into the slot.

These features and advantages of the present invention as well as others will be more fully understood when the following description of the preferred embodiment and modifications thereto are read in light of the accompanying drawings, in which:

FIG. 2 is an isometric view of one form of a holder forming part of the tie-down apparatus shown in FIG. 1;

FIG. 3 is an isometric view of a second form of the holder forming part of the tie-down apparatus shown in FIG. 1;

FIG. 4 is an isometric view of a modified form of a rail;

FIG. 5 is a sectional view taken along line V—V of FIG. 4;

FIG. 6 is a sectional view illustrating a telescopic arrangement of the rail according to a further modification of the present invention; and FIG. 7 is an isometric view illustrating a further modification of the holder to form the tie-down rail apparatus of the present invention.

Figure 1:
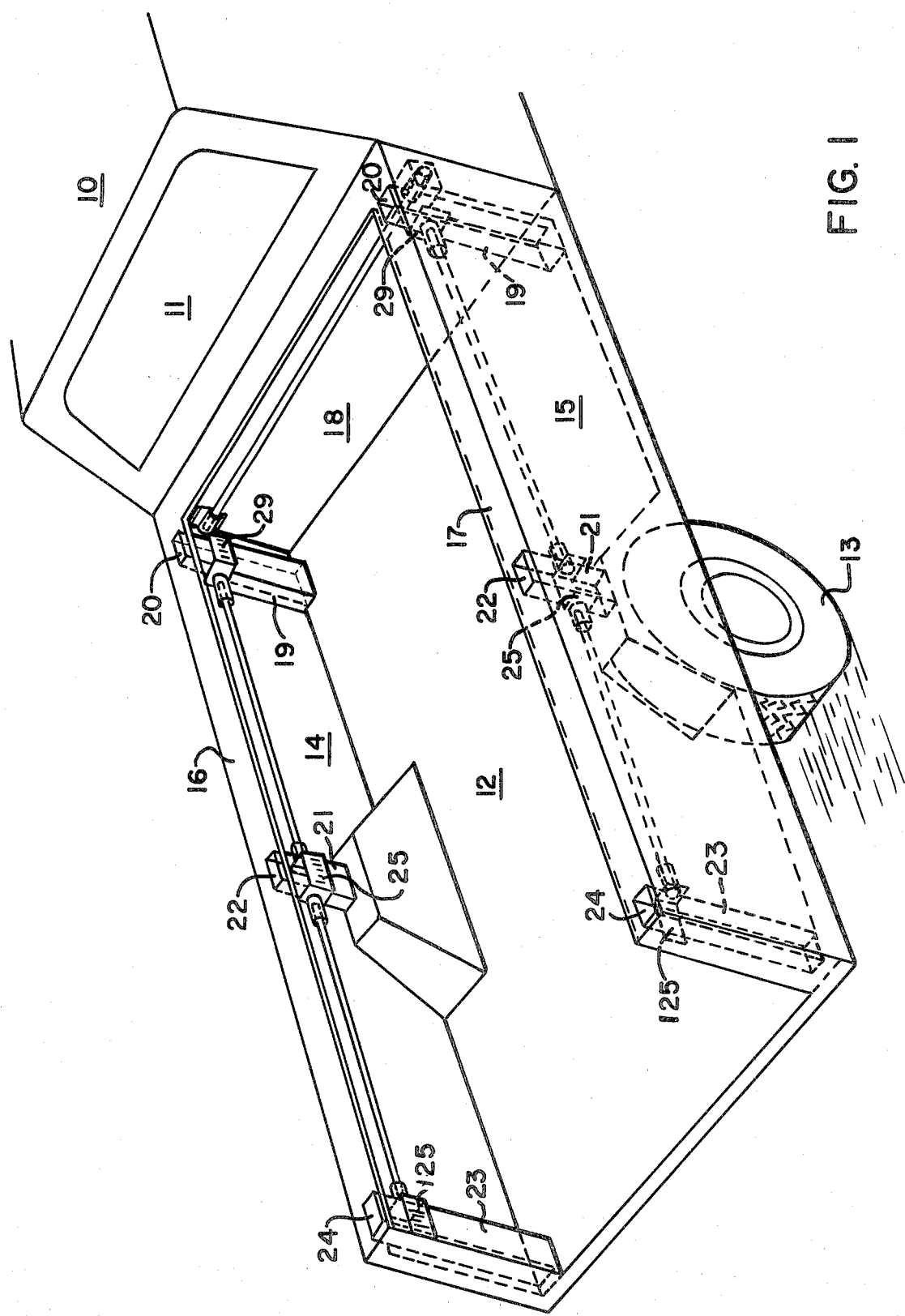
FIG. 1 is an isometric view to illustrate the bed area of a pick-up truck incorporating the tie-down apparatus of the present invention.

In FIG. 1, there is illustrated a portion of a pick-up truck of the type which is, per se, well known in the art. It is to be understood, however, that while a pick-up truck has been selected for the purpose of disclosing the tie-down apparatus of the present invention, other vehicles embodying a similar construction of parts will permit the use of the tie-down apparatus of the present invention as will be apparent to those skilled in the art. The pick-up truck shown in FIG. 1 includes the usual cab 10 with a rear window 11. A load-carrying bed 12 is supported on a chassis, not shown, having the usual wheels, one of which is identified by reference numeral 13. Upstanding side walls 14 and 15 include top rim walls 16 and 17, respectively, extending along opposed, longitudinal sides of the bed. Across the front of the bed, there is a front wall 18 and across the rear of the bed, there is a tailgate assembly, not shown. Projecting below each top rim wall 16 and 17 are spaced-apart stake walls each forming a vertical stake pocket opening out of the top rim wall. More specifically, walls 19 form front stake pockets 20, walls 21 form middle stake pockets 22 and walls 23 form rear stake pockets 24. Usually, the walls 19, 21 and 23 are rectangular and may or may not extend to the load-carrying bed 12, although such walls are confined to underlie the top rim wall 16 or 17.

In accordance with the preferred form of the present invention, each of the walls 21 for stake pockets 22 is surrounded along part of their vertical heights by a U-shaped holder 25. As best shown in FIG. 2, holder 25 embodies an arrangement of bent walls 25A, 25B, 25C to define a configuration to permit the face surfaces of the walls to fit tightly against the walls of the stake pockets for support thereby through the use of threaded fasteners, weld metal or the like. Opposed walls of the holder each carries a coupling socket 26 which is attached by weld metal, for example, such that an outwardly-projecting portion of the holder engages with an end portion of a rail 27. In the form shown in FIG. 2, rail 27 comprises a rod dimensioned to fit within a pocket area surrounded by the side wall of the socket. Each of the walls 23 for stake pockets 24 is surrounded along part of their vertical heights by an L-shaped holder 125 which is the same as holder 25 except wall 25C is eliminated as well as the socket 26 attached thereto. Depending upon the construction of the vehicle, a U-shaped holder may be used when access to three sides of walls 23 is possible.

Referring again to FIG. 1, it can be seen that holder 125 attached to the walls of a stake pocket 23 supports one end of a rail which extends to a holder 25 when attached for support by the walls 21 for a stake pocket 22. This holder has two coupling sockets, whereby a second rail 27 is supported by the holder to extend forwardly for support by a coupling socket 28 attached to an S-shaped holder 29 which is supported by walls 19 for a stake pocket 20. As shown in FIG. 3, S-shaped holder 29 consists of walls forming two pockets opening from opposite sides of the holder and one pocket is dimensioned to wrap around three sides of the walls 19. Holder 29 is attached to these walls by threaded fasteners or weld metal. The remaining pocket of the S-shaped holder 29 contains a coupling socket 31 which is attached by weld metal to the back crosswall defining this pocket in the S-shaped configuration of the holder. Coupling socket 31 is constructed in the same manner as coupling socket 26 to receive one end portion of a rail 32 which extends across the load-carrying bed at a location spaced thereabove and closely adjacent the surface of front wall 18. The opposite end portion of rod 32 as shown in FIG. 1 is supported by a second holder 29. Wall section 34 of holder 29 can be attached for support by front wall 18 through the use of suitable threaded fasteners or the like.

FIG. 4 illustrates a modification to the tie-down apparatus which essentially provides for the use of a rectangularly-shaped tube 35 for supporting opposite end portions of a rectangular tie-down tube 36. A coupling socket 35 is welded or otherwise attached to a holder 25 or 29 in the same manner as already described in regard to coupling sockets 26 and 28. The rectangular tube 36 includes a longitudinal wall having a slot 37 therein for receiving a shank portion of a tie fixture 38. As shown in FIG. 5, the tie fixture has an eyelet on its end projecting from the slot and a flange adjacent thereto for engaging a spacer 39. The spacer is jammed against the front face of the tube by the threaded engagement of the shank portion with one of a plurality of spaced-apart tapped holes 40 in the opposite longitudinal wall of the tube. The tie fixture can be moved from one attachment site defined by a tapped hole 40 to another attachment site by disengagement and reengagement of its threaded end portion with the tapped holes.

FIG. 6 illustrates a further modification to the tie-down apparatus of the present invention which essentially provides that the rail 27 is supported at one end portion by a connector 41 for telescoping movement into a pocket 42. The connector 41 includes an end portion to fit within a coupling socket 26, 28 or 35. A resilient member, such as spring 43, applies a force on rail 27 to urge it in a direction outwardly from the pocket while permitting telescoping movement of the rail in the pocket for insertion and removal from the coupling members. FIG. 7 illustrates a more simplified form of holder identified by reference numeral 44 for supporting a coupling socket. Holder 44 has a central mid-portion that projects from bent leg sections 45 when they are attached by a threaded fastener or weld metal to walls forming any one of the stake pockets.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A tie-down rail apparatus for a pick-up truck or the like having a load-carrying bed and at least upstanding side walls including top rim walls extending along opposed, longitudinal sides of the bed, said upstanding side walls carrying spaced-apart and generally rectangular stake walls forming vertical stake pockets opening out of said top rim walls, said tie-down rail apparatus being in combination with said stake walls and essentially comprising at least two holders having a configuration to fit against at least two sides of said stake walls at locations spaced between said top rim walls and said load-carrying bed for attached support by said stake walls, at least one coupling socket extending outwardly from each holder, and a rail means having a sufficient length to extend between said holders for support by the coupling sockets thereof, said coupling socket having a side wall surrounding a pocket area into which an end of said rail means is received.

2. The tie-down rail apparatus according to claim 1 wherein said holders include a U-shaped holder having walls dimensioned to wrap around three sides of one of said stake walls.

3. The tie-down apparatus according to claim 2 wherein opposed walls of said holder each carries a coupling socket.

4. The tie-down rail apparatus according to claim 1 wherein said holders include an L-shaped holder having walls dimensioned to wrap around two sides of one of said stake walls.

5. The tie-down rail apparatus according to claim 1 wherein said holders include an S-shaped holder having walls forming two pockets opening from opposite sides, one such pocket being dimensioned to wrap around three sides of one of said stake walls and the other of such pockets containing a coupling socket extending from a back crosswall of the S-shaped holder.

6. The tie-down rail apparatus according to claim 1 wherein said coupling socket includes a tube secured at one end to one of said holder members to receive an end portion of said rail means within the side walls thereof.

7. The tie-down rail apparatus according to claim 1 further including a tie fixture for releasable attachment to said rail means.

8. The tie-down rail apparatus according to claim 1 wherein said rail means includes a rail member, a connector having a pocket at one end for telescopic support of an end portion of said rail member, and resilient means engaged between said rail member and said connector within the pocket of the latter.

9. The tie-down rail apparatus according to claim 1 wherein said rail means includes a tube having rectangular side walls, and wherein said coupling socket on each holder includes rectangular side walls for mating engagement with rectangular side wall portions of said tube.

10. The tie-down rail apparatus according to claim 9 wherein one of said rectangular side walls of said tube defines a longitudinal slot, said apparatus further including a tie fixture including fastening means extending into said slot for support by said tube.

* * * * *